Jan. 1, 1957 A. M. CLOGSTON ET AL 2,776,371

QUANTIZING SYSTEM EMPLOYING CATHODE RAY TUBE

Filed July 18, 1952 2 Sheets-Sheet 1

INVENTORS: A. M. CLOGSTON
C. W. HARRISON

BY Hugh S. Wertz
ATTORNEY

INVENTORS: A. M. CLOGSTON
C. W. HARRISON
BY Hugh S. Wertz
ATTORNEY

United States Patent Office 2,776,371

Patented Jan. 1, 1957

2,776,371

QUANTIZING SYSTEM EMPLOYING CATHODE RAY TUBE

Albert M. Clogston, Morris Plains, and Charles W. Harrison, Gillette, N. J., assignors to Bell Telephone Laboratories, Incorporated, New York, N. Y., a corporation of New York Application July 18, 1952, Serial No. 299,644

10 Claims. (Cl. 250—27)

This invention relates to cathode ray tube systems. In one of its most important aspects, it relates to quantizing systems which employ cathode ray tubes as quantizing elements.

Quantization is the process whereby signal samples which may have any amplitude in a continuous range are represented as having one of a finite number of discrete amplitude levels in that or a corresponding range. Certain correlation studies of television signals make it advantageous to employ quantization to translate a continuous wave of signal information into a succession of discrete samples, each having one of the finite number of amplitude levels. For these studies, the signal wave is first sampled at the smallest time intervals at which the amplitudes can have independent values consistent with the bandwidth of the signal. As is well known in information theory, for a signal wave of a bandwidth of W cycles per second, the signal wave can have at most 2W independent values per second. This means that the signal wave can be completely specified by 2W samples per second. Accordingly, if the signal information is to be preserved entirely, it is important that the sampling rate be at least 2W samples per second. It is usual to designate the sampling interval $$\frac{1}{2W}$$

a Nyquist interval, and this terminology shall be employed henceforth in this description. Accordingly, for a four megacycle television signal wave to be specified completely, it is necessary to provide at least an eight megacycle sampling rate. As a result, for these correlation studies, it will be important to have a system suitable for quantizing at this same rate.

It is characteristic of quantizing systems that the input at times will assume levels at which the system cannot determine instantaneously which amplitude output level best represents the input. In these cases, the input lies between specified quantized levels. Such signals can be designated as "maybes." For high fidelity systems, it becomes important that these "maybes" be resolved into an arbitrary one of their two adjacent amplitude levels. Additionally, for high speed operation, it is important that this resolution be performed quickly.

The principal object of the present invention is to provide a novel high speed high fidelity quantizing system.

One feature of the present invention is a quantizing element which comprises a cathode ray tube in which the cathode ray beam is deflected periodically at the desired quantizing rate across a target assembly in accordance with the instantaneous amplitude of the input wave. The target assembly comprises a member of dielectric material which becomes locally conductive under electron bombardment, the target face of the member being coated with a continuous conductive layer from which the output is derived, and the back face thereof being contiguous with a row of an arbitrary number of conductive plates, each at a different potential, for fixing the discrete quantized amplitude levels. Intermediate between the ray source and the target assembly there is disposed a quantizing grid which is used to localize the cathode ray on only a single plate for any input amplitude. To this end, this quantizing grid is connected by way of a feedback circuit to the cathode ray deflection system. In operation, as a continuously variable input signal is applied on one set of deflection plates of the cathode ray tube, there is derived as an output from the conductive layer which forms the target face of the target assembly a succession of signal samples, each having one of the arbitrary number of quantized amplitude levels.

The invention will be more fully understood from the following more detailed description taken in connection with the accompanying drawings in which.

Figure 1:
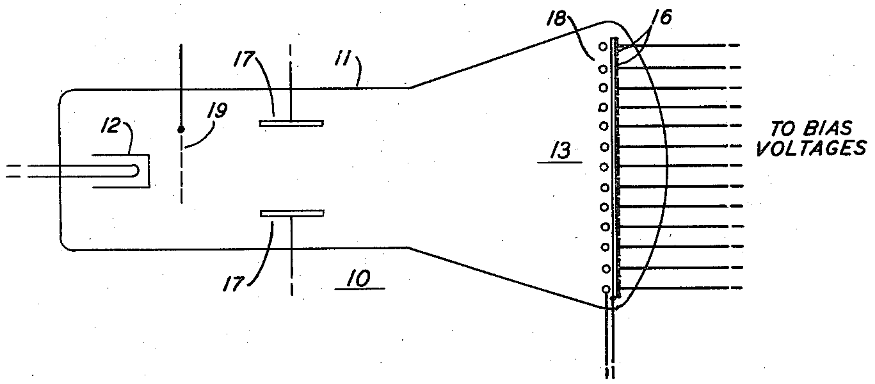
Fig. 1 shows schematically the cathode ray tube quantizing element which is a feature of applicant's invention.

With reference now to the drawings, the cathode ray device 10 shown in Fig. 1 comprises a highly evacuated envelope 11 having mounted therein at one end an electron gun 12 for producing a high density electron beam and at the opposite end a target assembly 13 disposed in target relationship to the electron gun. For simplicity, the electron gun has here been shown schematically since any one of a number of known constructions can be utilized. Such an electron gun comprises generally an electron emissive cathode, a heater unit, an intensity control grid and various focusing and accelerating electrodes. The target assembly 13 has an elongated rectangular configuration, a portion of which is shown in greater detail in Figs. 2A and 2B, and includes a layer 14 of material which although normally insulating becomes conductive under electron bombardment. Typical of materials which exhibit this property, known as bombardment induced conductivity, to varying extent are diamond, zinc sulphide, magnesium oxide, silicon carbide, silicon dioxide, germanium, and stibnite. Each of these materials is normally an insulator but under bombardment by a sufficiently high number of electrons (or other charged particles such as alpha or beta particles) it becomes locally conducting, if at the time an electric field exists between opposite surfaces across the bombarded area. For purposes of illustration, it will be assumed that the insulating member 14 is a layer of silicon dioxide approximately 4000 angstroms thick. One convenient expedient for constructing such an insulating member 14 is to deposit a continuous film of silicon dioxide on a fine wire mesh grid. The target face of this insulating member 14 is coated with a conductive material, such as aluminum, of a thickness that will allow electron penetration under electron bombardment at some convenient accelerating potential. For example, a film of aluminum several hundred angstroms thick can be used for 10 kilovolts accelerating voltages. The output current is derived from a connection to this conductive layer 15. On the back face of the silicon dioxide member 14 there are arranged in a linear array a series of spaced conductive rectangular plates 16, preferably of dimensions several times the diameter of the high density core of the electron beam at the time of incidence on the target. The number of plates fixes the number of quantizing levels available and so is chosen accordingly. Each of these individual plates is biased to a separate associated potential, and these potentials vary along successive plates of the array, preferably increasing in the direction corresponding to increasing signal deflection.

Along the path of the electron beam between the elec tron gun and the target assembly there is mounted a pair of deflecting plates 17, of the kind usual in cathode ray devices for deflecting the electron beam. Since for present purposes, it is sufficient to deflect the electron stream in only one direction, one pair of deflecting plates is adequate. Input signals are applied to these deflecting plates so that the amplitude of the input signal at the time of the deflection substantially determines the position of the beam along the target assembly. Adjustment of the signal level is made so that the largest signal amplitude to be coded represents the maximum deflection of the beam possible across the target assembly. For increased range of operation, the deflection plates can be normally biased so that zero signal amplitude corresponds to beam deflection to the zero end of the target assembly.

Additionally, there is associated with the electron gun the intensity control grid 19 which can be used to blank or, alternatively, to turn on periodically the cathode ray.

In operation, input samples are applied to the deflecting plates 17 and the cathode ray at constant density is deflected across the target assembly accordingly and localized on a particular region thereof. The accelerating voltage of the electron stream is chosen sufficiently high to permit penetration by the electron stream of the conductive layer 15 for bombardment of the silicon dioxide member 14. As a consequence, the bombardment region of the silicon dioxide member 14 becomes locally conductive, and there results between the particular plate 16 in contact with the affected region of the silicon dioxide member 14 and the conductive layer 15 current flow whose magnitude is determined by the biasing voltage in series with this particular plate. By the action of the silicon dioxide member 14, it is possible to obtain current flow in the conductive layer which is substantially independent of the beam current and which can conveniently be made of the order of hundreds of times that of the beam current. There can be accordingly realized a corresponding increase in sensitivity. This becomes increasingly important as the quantizing speed is increased, making feasible high speed operation with practicably realizable stream densities. It is this switching characteristic afforded by the use of this type of conduction control that contributes the principal advantages to the invention.

It will be helpful to examine briefly the circuit associated with one plate 16A (Fig. 2A) at the time the electron beam is incident on its associated region of the silicon dioxide member 14. The voltage V, provided by the biasing supply 40, in series with this plate causes a current to flow through the series resistance $R_1$, the now conductive silicon dioxide member 14, and the load resistor 25. The series resistance $R_1$, is a current limiting resistance and is preferably adjusted to be several times the value of the resistance of the member 14 in its conducting state. The general purpose of this resistor $R_1$ is to reduce the effect of small non-uniformities in the member 14. The output voltage is derived across the load resistor 25 for utilization.

Figure 2A:
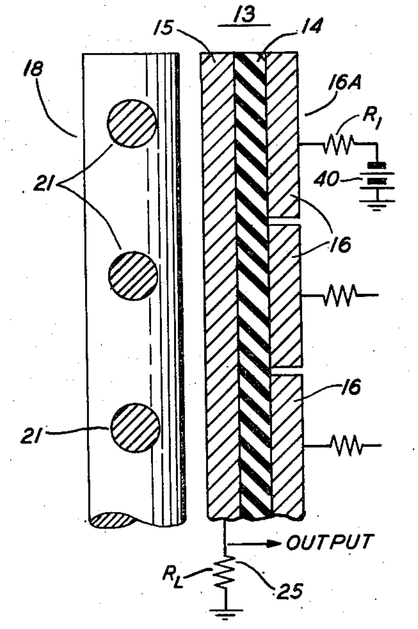
Figs. 2A and 2B show details of the quantizing element shown in Fig. 1.
Figure 2B:
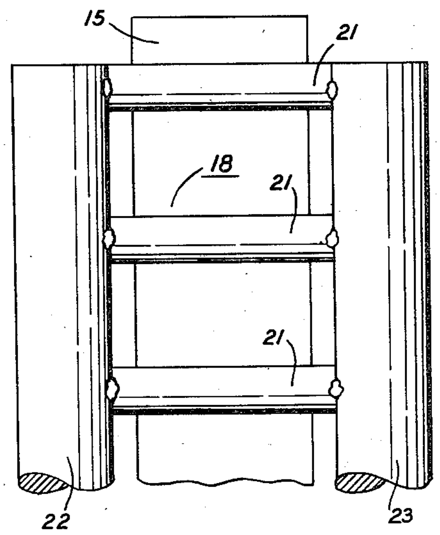

Difficulties arise in the arrangement so far described when the amplitude of the input sample is such as to concentrate the beam on a region of the silicon dioxide member intermediate two adjacent plates 16. For good quantizing action, it is important that the electron beam be localized in a region of the silicon dioxide member 14 in contact with only one plate 16 so that the biasing voltage associated with this plate alone will determine the current flow through the load resistance 25 across which the output voltage is developed. To this end, there is provided an auxiliary or quantizing electrode 18 mounted parallel and adjacent to, but spaced apart from, the conductive layer 15 which forms the face of the target assembly 13. This quantizing electrode 18 has a rectangular configuration similar to that of the target assembly 13 and comprises a series of parallel spaced relatively fine wires 21, as shown in Figs. 2A and 2B, each of which extends across the face of the target between two suitable end supports 22 and 23. The beam is deflected in a direction transverse to the orientation of the parallel wires 21 by input signals. For each plate 16, there is a grid wire positioned so that its underside corresponds approximately to the center of the plates 16. Some allowance is advisable in the positioning of wires furthest removed from the center for the increasing angle of incidence of the deflected electron stream. The quantizing grid is used to provide feedback to the deflection plates which tends to stabilize the high density core of the cathode ray to positions corresponding to the central regions of plates 16. In this respect the cathode ray quantizer which features the present invention resembles the cathode ray coder described in United States Patent 2,458,652 to R. W. Sears to which reference may be had for a more detailed description of the principles of such a quantizing electrode. In that cathode ray coder the target is a coding mask having a plurality of rows of apertures therein, the apertures being arranged so that an electron beam swept across the several rows will produce pulse groups, the character of each group being determined by the input at the time of the sweep. The position of the sweep is determined in turn, by the amplitude of the input at the time of the sweep. Intermediate the beam source and the coding plate, there are interposed a quantizing grid and a collector electrode. The quantizing grid comprises a plurality of wires having a secondary electron emission coefficient greater than unity, and spaced apart a distance of the order of the diameter of the electron beam. The collector electrode is positioned in secondary electron collecting relation with the quantizing grid and in the operation of the device is connected to the beam deflection system through a feedback circuit. The quantizing grid is mounted parallel to the coding plate. In operation if the electron beam were swept across the grid wires, the beam current to the quantizing grid would vary periodically, being a maximum when the beam is centered on any grid wire and a minimum when the beam is centered on the opening between two adjacent grid wires. The secondary electron current from the grid wires varies in like manner, and accordingly so does the current in the collector electrode. The collector current is converted into a voltage which is applied across the deflector plates and thereby superimposed on the input signal. Thus, for any position of the beam, the effective deflecting potential is the sum of the potential due to an input signal and the feedback potential due to the collector electrode. It is there shown that for the condition of large negative feedback (i. e. the condition where the potential of the feedback is to oppose the signal potential, and of a magnitude several times the potential necessary to displace the electron beam the center-to-center spacing of adjacent grid wires in the absence of feedback voltage) the electron beam is stable when deflected to the furthermost position between grid wires short of the grid wire defining the succeeding increasing amplitude level. In the device which features the present invention, the same general principles are applicable in the operation of the quantizing grid. However, to increase the speed of operation, the feedback current is derived directly from the quantizing grid. In this case too, the feedback current is supplied to suitable amplifier means and converted into an appropriately large negative feedback voltage for application to the deflection plates. With reference to Fig. 2A, if the electron beam is made to be deflected upwards in the plane of the paper for increasing input signal voltages, the stable positions for the beam correspond to positions just below the grid wires 21. Since it is desirable, for least ambiguity and a minimum of "maybes" that the electron beam be stable at a position along the target corresponding to the center portion of the plates, the relative positioning of the grid wires and plates is adjusted so that the regions of stable beam positions are aligned along the electron path with the central regions of the plates 16.

In this case, the fringe electrons which penetrate to regions of the silicon dioxide member 14 other than the region in contact with the particular plate 16 are of insufficient density to make these other regions conductive.

Figure 3:
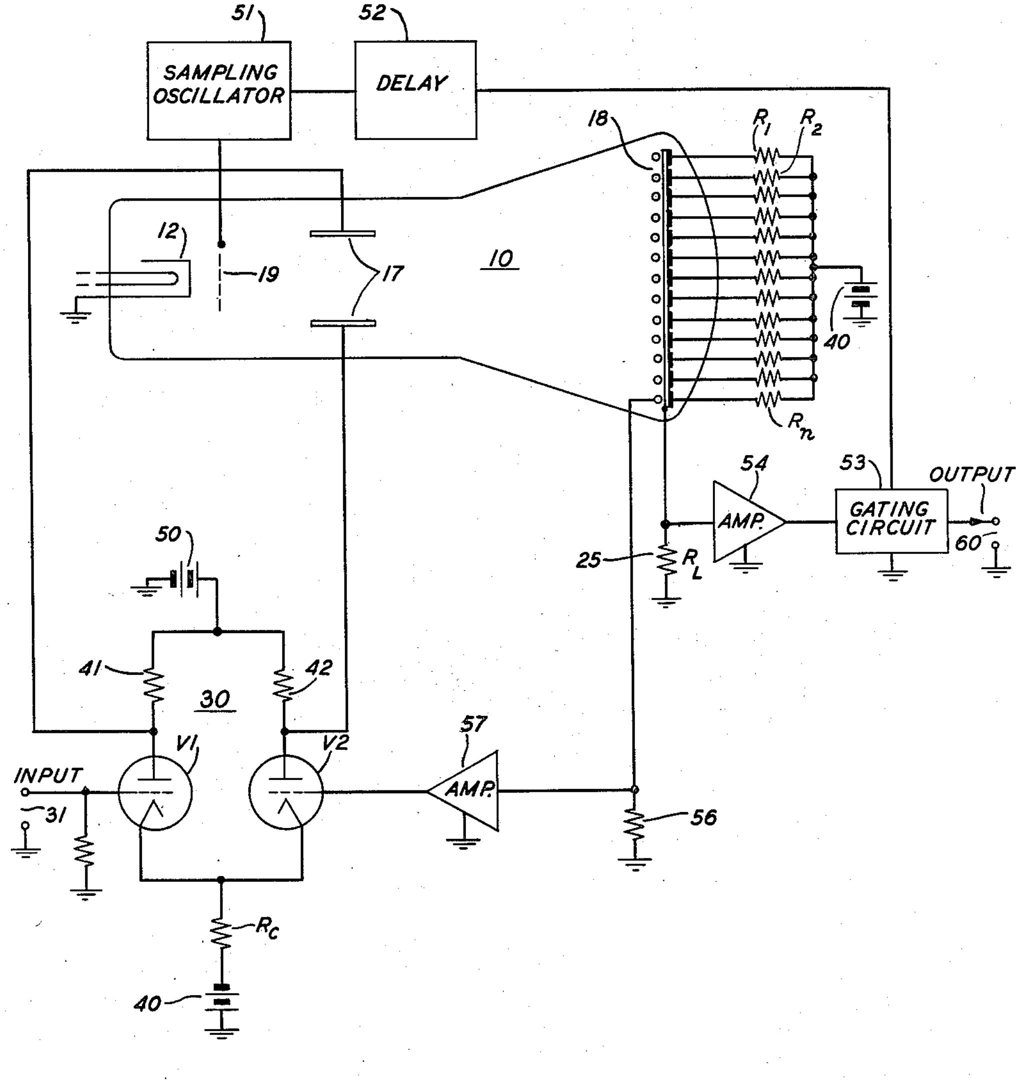
Fig. 3 shows a quantizing system which incorporates the quantizing element shown in Fig. 1 in accordance with the invention.

An illustrative quantizing system which utilizes for the quantizing operation a cathode ray tube similar to the one described above is shown by way of example in Fig. 3. It is convenient to utilize the reference numerals used in describing the various elements shown in Fig. 1 in designating the corresponding elements in the system of Fig. 3. As above, the tube 10 comprises essentially an electron source 12, a target assembly 13 which includes a conductive layer 15, an insulating member 14 and a series of conductive plates 16, deflection plates 17, the quantizing electrode 18, and an intensity control or blanking grid 19. An input signal to be quantized, for example, a television wave, is applied across the input terminals 31 to the input of one section of the differential amplifier 30 comprising the vacuum tubes V1 and V2 and associated circuitry. The differential amplifier shown is of a kind well known in the art for subtracting two input voltages and providing therefrom two outputs of opposite polarity but each equal in magnitude to the difference of the two input voltages. For this differential action, tubes V1 and V2 have their cathodes coupled together and connected through the common cathode resistance $R_c$ to the negative terminal of the voltage supply 40. For good differential action the resistance $R_c$ is chosen considerably greater than $1_{gm}$ where *gm* is the transconductance of each of the tubes V1 and V2 and also greater than the load resistances 41 and 42 in the plate circuits of tubes V1 and V2, respectively. Each of the two signals to be compared is supplied to a different one of the two control grids of the differential amplifier. In the present instance the input television wave is applied to the control grid of tube V1 while the feedback voltage derived from the quantizing electrode 18, as described earlier, is applied to the control grid of tube V2. Each of the two equal and opposite pulses derived across the resistances 41 and 42 is applied to a different one of the two deflection plates 17 to provide the beam deflecting fields. Sampling is effected by applying sampling pulses to the intensity control grid 19. The amplitude and polarity of these sampling pulses is made to overcome the normal bias on this grid which otherwise keeps the beam blanked and so the electron beam is turned on for the length of the sampling pulse. In the exemplary embodiment being described which is designed for quantizing a four megacycle television wave, a suitable sampling oscillator 51 provides sampling pulses at Nyquist intervals, or at a rate of eight million per second. Pulses from the oscillator 51 are also applied after a suitable delay inserted by means of element 52 to enable the gating circuit 53 in the output circuit of the quantizing tube. The delay provided by the element 52 is made equal to the operating time of the quantizing tube as will be more fully described below.

The operation is essentially as has been described previously. When turned on by the sampling pulses, the electron beam is deflected across the face of the target assembly 13 in accordance with the magnitude of the deflecting signals then being provided by the differential amplifier 30. By the action of the quantizing electrode 18 the electron beam is quickly concentrated on a region of the insulating layer 14 associated with only one of the plates 16. To this end, electrons impinging on wires of the quantizing electrode 18 set up a current flow through the resistance 56 and the voltage resulting thereacross is amplified by the amplifier 57 and utilized as one input to the differential amplifier 30. For high speed operation, it is generally advantageous to design the differential amplifier 30 and the feedback amplifier 57 to have response times short in comparison to a Nyquist interval. Usually, D. C. amplifiers because of a minimum of interstage capacity, are preferable for this purpose. The output current flowing in the conductive layer 15 will be determined by the voltage on the plate 16 adjacent that portion of the insulating member 14 on which is localized the electron beam. This output current flows through the load resistance 25 and the resultant voltage thereacross is applied by way of a suitable isolating amplifier 54 to the gating circuit 53, which is periodically enabled by a pulse from the sampling oscillator 51. This pulse is delayed sufficiently so that at the time the gating circuit is is enabled, the electron beam has reached a stable position and the output voltage is at one of the arbitrary number of amplitude levels. By the action of this gating circuit, there is minimized the effect of "maybes" resulting while the beam position is being stabilized. By way of example, the gating circuit can be a conventional pentode to whose control grid are applied the signals provided by amplifier 54 and to whose suppressor grid is applied periodically the delayed pulses which enable the gate by permitting the flow of plate current which is otherwise cut off. In this arrangement, the output current is controlled by inserting in series with the biasing voltage supply V a different one of the series of resistances $R_1$–$R_n$ for each of the plates 16. In this way there results across the resistance 25 a series of discrete samples each having one of a finite number of amplitude levels in response to a continuous wave applied across the input terminals 31 and this series is of discrete samples available at the output terminals 60 for utilization.

Although the cathode ray device which is the principal feature of the invention has been described particularly with respect to a quantizing system, it should be evident that other applications therefor are possible. For example, it makes available a high speed encoder suitable for remapping message samples in terms of probabilities of occurrence of specific amplitude levels. An encoding system of this kind is described in a copending application Serial No. 170,979, filed June 29, 1950, by B. M. Oliver, which issued as United States Patent No. 2,721,900 on October 25, 1955. For such use, each of the conductive plates would be biased in accordance with the probability of occurrence of the corresponding deflection amplitude. For example, with the plate corresponding to the most probable signal amplitude there would be associated the minimum bias voltage and, conversely, with the plate corresponding to the least probable signal amplitude, the maximum bias would be associated. The voltage on the other plates would similarly be graduated on a probability basis. In this way, the average output signal power can be minimized, the advantages of which are described in the above mentioned Oliver application. Similarly, this technique can be carried over into more elaborate encoding systems such as systems which take into account conditional probabilities, i. e. the probabilities of the various possible amplitudes of a given message sample based on the amplitudes of preceding samples. In such a case, it is advantageous to employ a rectangular array of plates, to sweep the electron beam in turn both vertically and horizontally, and to employ as the quantizing electrode a lattice of both vertical and horizontal grid wires.

Similarly, the high speed switching properties of the cathode ray device described can be utilized in still other ways which can be devised by one skilled in the art without departing from the spirit and scope of the invention. Accordingly, it is to be understood that the particular embodiment which has been described in detail is merely illustrative of the principles of the invention.

What is claimed is:

1. In combination, a cathode ray tube comprising a target assembly having a normally high resistivity member which becomes locally conductive under electron bombardment, a conductive layer contiguous with the target face of said member, and a plurality of aligned spaced conductive plates contiguous with the back face of said member, means for projecting an electron stream against the target face of said target assembly, means for deflecting the electron stream in the direction of alignment of said plates in accordance with the amplitude of input signals, and an auxiliary electrode interposed between the projection means and the target assembly; feedback coupling means between said auxiliary electrode and the deflecting means, and means for deriving from said conductive layer output signals the magnitudes of which are substantially independent of the current in said beam.

2. In combination, a cathode ray tube comprising a target assembly having a normally high resistivity member which becomes locally conductive under electron bombardment, a conductive layer contiguous with the target face of said member, a plurality of conductive plates contiguous with the back face of said member in a linear array, and means for biasing successive plates of the linear array at successively increasing voltages, means for projecting an electron stream against the target face of said target assembly, means for deflecting the electron stream in the direction of said linear array of plates in response to input signals, and an auxiliary electrode interposed between the projection means and the target assembly; feedback coupling means between said auxiliary electrode and the deflecting means, and means for deriving from said conductive layer output signals the magnitudes of which are substantially independent of the current in said beam.

3. In combination, a cathode ray tube comprising a target assembly having a normally high resistivity member which becomes locally conductive under electron bombardment, a conductive layer contiguous with the target face of said layer, and a plurality of aligned spaced conductive plates contiguous with the back face of said member, means for projecting an electron stream against the target face of said target assembly, means for deflecting the electron stream in the direction of alignment of said plates in response to input signals, and an auxiliary electrode interposed between the projection means and the target assembly; means for applying a signal wave to the deflecting means, means for energizing the electron stream at a particular sampling rate, feedback coupling means between said auxiliary electrode and the deflecting means, means for deriving from said conductive layer output signals the magnitudes of which are substantially independent of the current in said beam, and gating means supplied with said output signals and enabled at the sampling rate.

4. A cathode ray tube comprising a target assembly having a normally high resistivity member which becomes locally conductive under electron bombardment, a conductive layer contiguous with the target face of said member, and a plurality of aligned spaced conductive plates contiguous with the back face of said member; means for projecting an electron stream against the target face of said target assembly, means for deflecting the electron stream in a direction of alignment of said plates in response to input signals, and an auxiliary electrode comprising a plurality of parallel elements extending transverse to the path of beam deflection interposed between the projection means and the target assembly.

5. A cathode ray device according to claim 4 in which said conductive layer is sufficiently thin to be transparent to the electron stream.

6. A cathode ray tube comprising a target assembly having a normally high resistivity member which becomes locally conductive under electron bombardment, a thin conductive layer contiguous with the target face of said member, and a plurality of aligned spaced conductive plates contiguous with the back face of said member; means for projecting an electron stream against the target face of said target assembly at a velocity sufficient for penetrating said thin conductive layer to said insulating member, and means for deflecting the electron stream in the direction of alignment of said plates in response to input signals.

7. In a cathode ray tube, a target assembly comprising a normally high resistivity member which becomes locally conductive under electron bombardment, a thin conductive layer contiguous with the target face of said member, a plurality of aligned spaced conductive plates contiguous with the back face of said member, successive plates being biased at successively increasing voltages, and means for projecting an electron stream at the target assembly at a velocity sufficient for penetrating said conductive layer to said insulating member.

8. In a cathode ray tube, a target assembly comprising a normally high resistivity silicon dioxide member which becomes locally conductive under electron bombardment, a thin aluminum layer contiguous with the target face of said silicon dioxide member, and a plurality of aligned spaced conductive plates contiguous with the back face of said silicon dioxide member, successive plates being biased at successively increasing voltages; and means for projecting an electron stream at the target assembly at a velocity sufficient for penetrating said aluminum layer to said silicon dioxide member.

9. A device for representing samples of a signal which may have any amplitude in a continuous range as having one of a finite number of discrete amplitude levels comprising a target assembly including a member which is normally of high resistivity but which becomes locally conductive under bombardment by charged particles, a thin conductive layer contiguous with the target face of said member, means for forming a stream of charged particles for bombardment of said member, means for deflecting said stream across said member in accordance with the amplitude of input signals, whereby the portion of the member which becomes locally conductive is a measure of the instantaneous amplitude of the input signal, means for providing current flow through the locally conductive portion of the member which is a measure of said instantaneous amplitude and which is substantially independent of the current in said stream, and means for deriving this current flow for utilization.

10. In a cathode ray device, a target assembly comprising a member which is normally of high resistivity but which becomes locally conductive where bombarded by charged particles, a thin conductive layer contiguous with the target face of said member, means for forming a stream of charged particles for bombarding regions of said member, means setting up different potentials across different discrete regions of said member, means for concentrating the stream of charged particles on particular discrete regions of said member in accordance with input intelligence for making such regions conductive, and means for deriving the current flow through said conductive discrete regions for utilization said current flow being substantially independent of the beam current.

References Cited in the file of this patent

UNITED STATES PATENTS

| | | |
|---|---|---|
| 2,202,511 | Andrieu | May 28, 1940 |
| 2,463,535 | Hecht | Mar. 8, 1949 |
| 2,472,774 | Mayle | June 7, 1949 |
| 2,496,633 | Llewellyn | Feb. 7, 1950 |
| 2,515,931 | Six et al. | July 18, 1950 |
| 2,527,981 | Bramley | Oct. 31, 1950 |
| 2,544,754 | Townes | Mar. 13, 1951 |
| 2,564,908 | Kuchinsky | Aug. 21, 1951 |
| 2,588,292 | Rittner et al. | Mar. 4, 1952 |
| 2,632,147 | Mohr | Mar. 17, 1953 |